United States Patent [19]
Winter

[11] 4,209,885
[45] Jul. 1, 1980

[54] PROCESS AND APPARATUS FOR MAKING COMPOSITE SHEET AND HEAT EXCHANGER PANELS THEREFROM

[75] Inventor: Joseph Winter, New Haven, Conn.

[73] Assignee: Olin Corporation, New Haven, Conn.

[21] Appl. No.: 937,118

[22] Filed: Aug. 28, 1978

[51] Int. Cl.² .................... B21D 53/04; B21D 26/04; B21K 29/00; B23P 15/26
[52] U.S. Cl. ............................... 29/157.3 V; 228/117
[58] Field of Search ............... 29/157.3 V; 228/117, 228/235, 237, 243, 191

[56] References Cited
U.S. PATENT DOCUMENTS

| | | | |
|---|---|---|---|
| 3,004,327 | 10/1961 | Keith et al. | 29/157.3 |
| 3,045,618 | 7/1962 | Adams | 113/51 |
| 3,377,683 | 4/1968 | Tranel | 29/157.3 |
| 3,465,406 | 9/1969 | Myers | 29/157.3 V |

*Primary Examiner*—Milton S. Mehr
*Attorney, Agent, or Firm*—Paul Weinstein

[57] ABSTRACT

A process and apparatus for making composite sheet and heat exchanger panels therefrom. At least two sheets of metal are bonded together by cold rolling to form a "green" bond. Immediately following the bonding operation the as bonded composite is quickly cooled to a temperature at which noticeable bond enhancement will not occur. A desired pattern of tubular passageways is then inflated into the composite while the composite is held in a die.

22 Claims, 13 Drawing Figures

PROCESS AND APPARATUS FOR MAKING COMPOSITE SHEET AND HEAT EXCHANGER PANELS THEREFROM

BACKGROUND OF THE INVENTION

This invention relates to an improved process and apparatus for making composite metals and tube in sheet type heat exchange panels therefrom. These panels find particular application in solar energy collectors and related type devices.

PRIOR ART STATEMENT

Tube in sheet type heat exchange panels have been made commercially for many years by the ROLL-BOND® process as exemplified in U.S. Pat. No. 2,690,002 to Grenell. These panels have found wide commercial application in refrigerator heat exchangers. More recently they have found application in the field of solar energy as absorber panels, etc., as exemplified in U.S. Pat. Nos. 4,021,901 and 4,066,121 to Kleine et al. and U.S. Pat. No. 4,093,024 to Middleton.

The ROLL-BOND® process has proved to be highly effective for those applications, however, there are some difficulties associated with the process. One difficulty is the inability to precisely control the final shape and location of the pattern of stop weld material sandwiched between the composite metal sheets after they have been bonded together. The aforenoted difficulties result in the need for large tube free portions at the sides and ends of the panels, which can greatly reduce their efficiency and increase the cost of the panels.

While the ROLL-BOND® process as set forth in the Grenell patent has found worldwide commercial application, other processes for obtaining tube in sheet type panels are also known. One of those processes comprises an approach wherein the composite metal sheets are "green" bonded together without a stop-weld pattern and the tubular pattern is formed by inflation in a die whose cavity defines the tubular pattern. Various examples of this process are set forth in U.S. Pat. No. 3,271,846 to Buechele et al., U.S. Pat. No. 3,346,936 to Miller et al., U.S. Pat. No. 3,435,504 to Miller and U.S. Pat. No. 3,465,568 to Jonason and in Australian Pat. No. 212,814 to Watson.

In the Australian patent to Watson there is disclosed a process for making heat exchangers wherein clean faced sheets of metal are roll forged to provide a bond that can be broken by internal pressure. The bonded sheets are placed in a matrix die having a cavity or cavities therein corresponding to the shape and configuration of the ducts required in the heat exchanger. Pressure is applied to inflate the respective ducts, etc., in conformity with the die cavity. The process as disclosed can be carried out without a bond enhancement heat treatment.

The Miller patent describes the use of the bonding process employing cold rolling as disclosed in U.S. Pat. Nos. 2,691,815 and 2,753,623 to Boessenkool et al. Another known bonding process wherein sheets are strongly bonded together by cold rolling is disclosed in U.S. Pat. No. 3,397,045 to Winter.

SUMMARY OF THE INVENTION

In accordance with this invention an improved process and apparatus is provided for making composite metals and heat exchanger panels therefrom particularly adapted for use in solar applications. Clean faced sheets of metal are bonded together by cold rolling to a specific reduction in thickness to form a composite having a "green" bond which can be broken at reasonable inflation pressures. The inflation is carried out while the composite is clamped within a die having a cavity or cavities defining a desired tubular configuration. It is a significant aspect of this invention that the composite material immediately after bonding is quickly cooled to a temperature at which noticeable bond enhancement will not occur. By quickly cooling the composite immediately after bonding any variability in bond strength due to the heat build up in the composite during bonding is minimized.

The process of the present invention is particularly adapted for use with copper and copper alloys or aluminum or aluminum alloys. For copper and copper alloys, it has been found that the total reduction in thickness for bonding by cold rolling must be maintained within a specific critical range of reduction in order to insure that the composite can be later expanded at convenient pressures by die inflation.

It is preferred in accordance with this invention that the die inflation be carried out with the composite panel in its roll temper following bonding. The as-rolled condition of the composite panel requires that the shape of the passageways must be controlled and the aspect ratio of the passageways must be maintained below a desired level in order that the tube walls do not rupture while still obtaining satisfactory heat exchange panels by die inflation.

It is preferred in accordance with the present invention that the inflation needle inserted into the panel prior to die inflation have an oval or half oval cross section so that it can be inserted into the composite panel in the roll temper without causing fracture or other defects.

The process of this invention is suited for making panels which in the "green" bonded condition have sufficient bond strength for use in conventional low pressure applications such as solar energy absorber plates. If the panels are desired for use with higher pressure applications, it is possible in accordance with this invention to provide bond enhancement by heat treating the panels at a desired temperature, after the inflation of the tubular passageways therein.

The apparatus for carrying out the process of this invention includes a means for rolling the sheets together to form a "green" bonded composite and means immediately adjacent the rolling means for quickly cooling the as-rolled composite to a temperature at which noticeable bond enhancement will not occur.

Accordingly, it is an object of this invention to provide an improved process and apparatus for making composite metals and heat exchanger panels therefrom.

These and other objects will become more apparent from the following description and drawings.

DETAILED DESCRIPTION OF PREFERRED EMBODIMENTS

Figure 1:
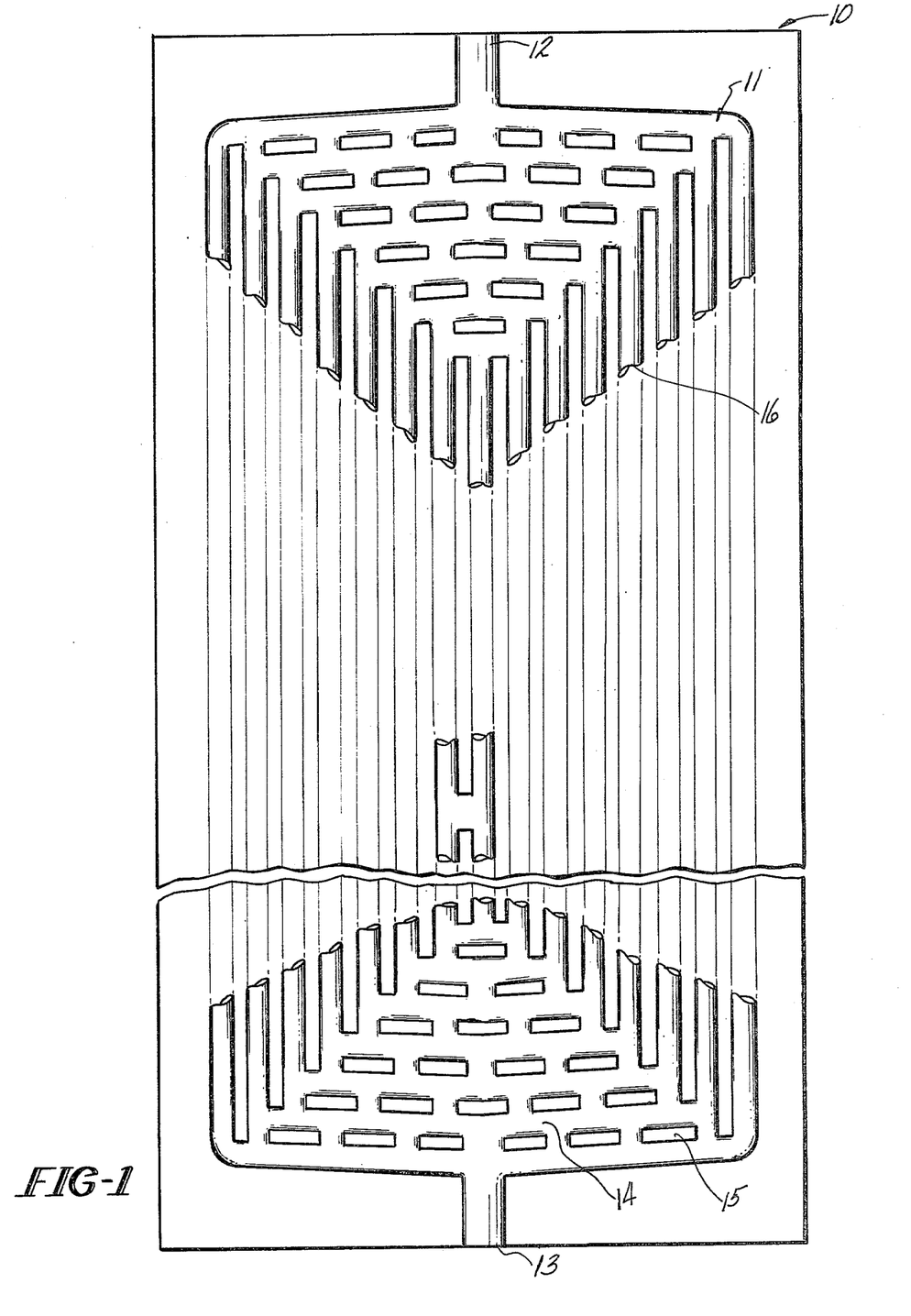
FIG. 1 is a schematic illustration of a heat exchanger panel in accordance with this invention.

Referring now to FIG. 1 there is shown by way of example a schematic illustration of a heat exchanger panel 10 useful in applications involving solar energy. For example, the panel 10 is useful as an absorber plate in a solar energy collector. The panel shown in FIG. 1 is representative of a plank type panel which is approximately about 12 inches wide and from 6 to 10 feet long. Absorber panels 10 having various sizes are known in the art. The panel 10 itself is of a tube in sheet configuration. The panel is formed from composite metal sheets which remain bonded together everywhere except where tubular passageways 11 or channels have been expanded within the composite. A variety of techniques have been utilized to form tube in sheet type heat exchanger panels as described in the background of the invention. The present invention is particularly directed to an apparatus and process for forming a tube in sheet heat exchanger as in FIG. 1 by first "green" bonding the composite sheets together followed by die inflation.

The specific design of the panel 10 shown in FIG. 1 includes entry 12 and exit ports 13 communicating with triangular shaped headers 14. The headers 14 include a plurality of bonded islands 15 for obstructing and directing the flow of the heat exchange fluid to provide uniform flow across the width of the panel 10. The triangular shaped headers 14 are connected together by a plurality of parallel tubular passageways 16.

Difficulties arise in the manufacture of panels 10 of the general type as shown in FIG. 1 or any of the various alternative configurations which are known in the art, when the "green" bond and die inflation method is used. The inflation pressure necessary to form the tubular passageways 11 in the composite sheet while supported in the die is a direct function of the bond strength between the sheets of the composite. It will be shown hereinafter that the bond strength is a function of the percent reduction employed in bonding the composite together by rolling and, further, that heating the as-bonded composite at elevated temperatures results in significant bond enhancement.

The present process is particularly directed to the use of cold rolling as the means for bonding the composite sheets together prior to die inflation. The range of reduction utilized to obtain the desired bond level causes a substantial residual heat build up in the panel so that the panel exits the rolls at an elevated temperature. The panels are normally stacked after bonding and depending on the number of panels in the stack the rate at which they cool to room temperature varies widely. The process of this invention is also useful in connection with the formation of the composite panel in a continuous manner through the use of coiled metal strip which after bonding may be recoiled and then cut to the desired panel lengths. When the composite strip is coiled after bonding the tightness of the wrap of the coil will affect how fast the residual heat built up in the metal during bonding is dissipated, thereby resulting in a variation in the rate of heat extraction from the composite metal after bonding. This variation in the heat extraction rate is believed to cause an undesirable variation in the bond strength of the composite metal because the elevated temperature of the as-bonded composite can provide a degree of bond enhancement. The smaller the rate that the residual heat is extracted from the panel the greater the degree of bond enhancement and vise a versa.

To overcome these problems in accordance with the present invention the composite metal is quenched or otherwise quickly cooled to a temperature below which bond enhancement does not occur immediately following the bonding operation. In this way, the degree of bonding of the composite metal sheets can be accurately controlled by the percent reduction to which the sheets are subjected during cold rolling and will be substantially unaffected by the number of panels stacked together when discrete panels are manufactured or the tightness of the wrap of the coil when a continuous composite strip is made.

Figure 2:
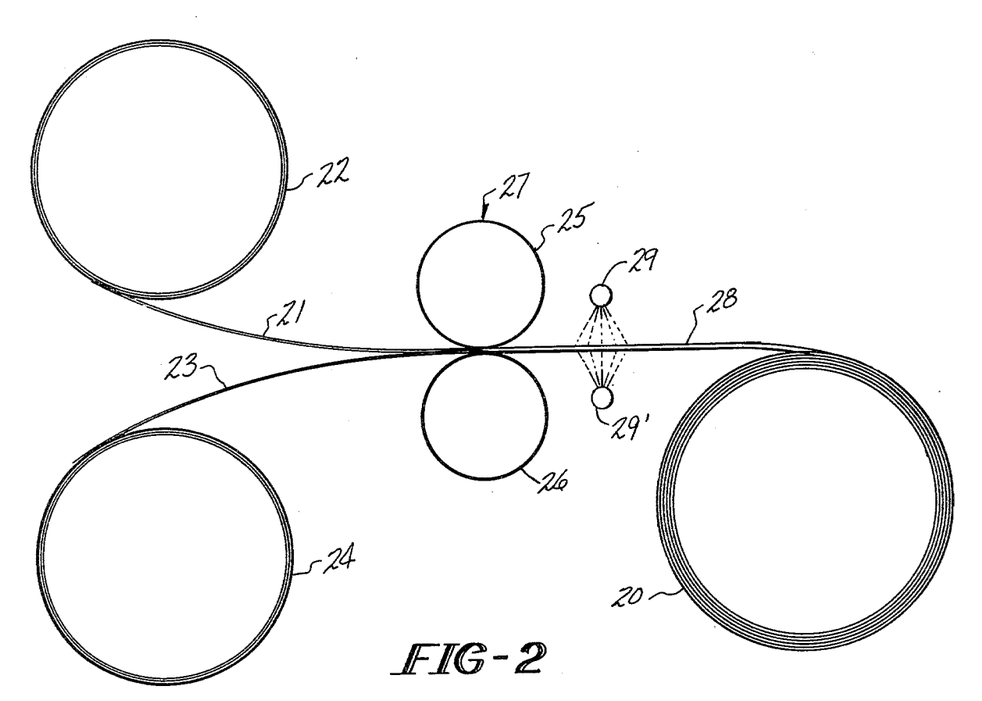
FIG. 2 is a schematic illustration of an apparatus in accordance with this invention for continuously "green" bonding strip in coil form.

Referring now to FIG. 2 the process and apparatus in accordance with one embodiment of the invention will be described. This embodiment is directed to the formation of a continuous coil 20 of composite metal. A continuous strip comprising one sheet 21 of the composite is fed from a first coil 22 and a continuous strip comprising the opposing sheet 23 of the composite is fed from a second coil 24. The contacting faces of the respective sheets 21 and 23 are wire brushed and otherwise suitably cleaned prior to meeting at the nip defined by the upper 25 and lower 26 rolls of the rolling mill 27. Since the cold rolling for bonding is normally carried out at high speeds the contacting faces of the sheets 21 and 23 are preferably cleaned "off-line", namely the coiled strip 22 and 24 is cleaned prior to being payed off into the nip of rolls 27. If an appropriate high speed cleaning method were available then the sheets 21 and 23 could be preferably cleaned "in line" between the coils 22 and 24 and the rolls 27. The rolling mill 27 comprising rolls 25 and 26 subjects the overlapped sheets 21 and 23 to a desired reduction in thickness to provide a so-called "green" bonded composite 28 having a moderate degree of bond strength.

Immediately adjacent to the rolling mill 27 and in close proximity downstream thereof, there is positioned a coolant application station 29 wherein coolant is applied to the as bonded composite metal strip 28 in order to reduce its temperature to a temperature below which substantial bond strength enhancement will not occur. Following the quenching operation the composite metal strip may be again coiled for further processing as desired. The coolant application station 29 shown is arranged preferably above the strip 28 and directs a curtain of a coolant such as water against the top surface of the composite strip 28. The rate of coolant application may be set as desired and will vary with the composition of the composite strip 28, its thickness and its rate of travel through the station 29. The rate of coolant application should be sufficient to lower the temperature of the strip below the temperature required for bond enhancement.

If desired, an auxiliary coolant application station 29' could be located below the strip 28 to apply the coolant to the bottom surface of the strip. Alternatively the coolant application station 29' could be used in place of the station 29.

After bonding the composite strip 28 may be coiled as in FIG. 2 for further processing off-line or it could be subjected to further processing in line as desired.

Figure 3:
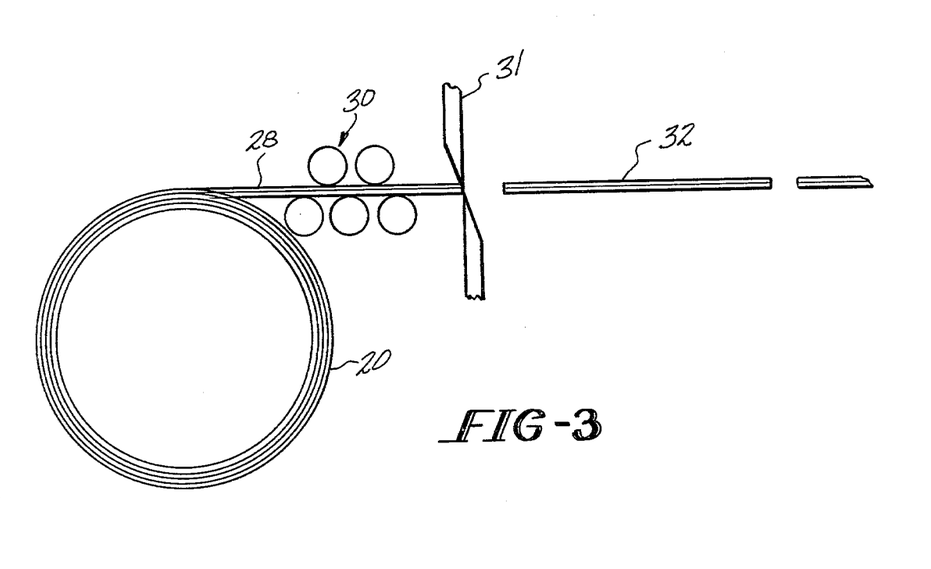
FIG. 3 is a schematic illustration of an apparatus in accordance with this invention for dividing the coiled composite strip into panel length segments.

Referring now to FIG. 3 the coil 20 of composite metal strip 28 from FIG. 2 is fed to a roll straightener 30 or other suitable straightening device and then to a shearing station 31 wherein unexpanded composite metal panels 32 having a desired length are severed from the strip. If desired, the shearing operation can be carried out in line in the apparatus of FIG. 2 in place of the coiling operation shown therein. This could be accomplished through the use of a flying shear as are known in the art.

Figures 4, 5, 6, 7, 8:
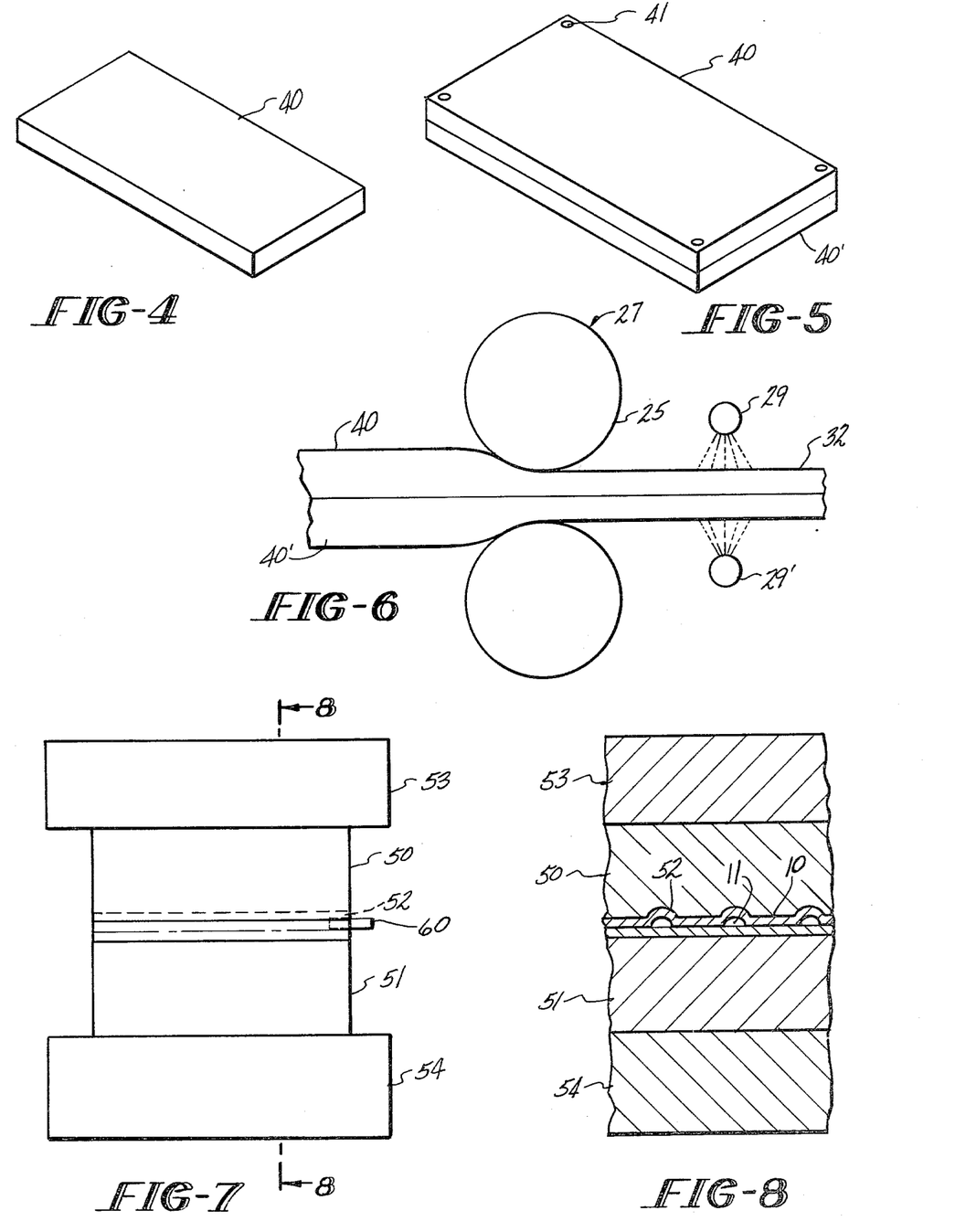
FIG. 4 is a perspective view of a metal sheet used to make a composite panel in accordance with a different embodiment of the present invention.
FIG. 5 is a perspective view of overlapped and staked sheets prior to bonding.
FIG. 6 is a schematic representation of an apparatus for bonding the sheets of FIG. 5 in accordance with this invention.
FIG. 7 is a schematic representation of a die inflation apparatus in accordance with this invention.
FIG. 8 is a partial cross-sectional view of the die inflation apparatus of FIG. 7, along the line 8—8 in FIG. 7.

Alternatively, in accordance with another embodiment of this invention the composite metal panels 32 may be formed from panel size strips of metal 40 such as shown in FIG. 4. Two such strips 40 and 40' having at least one face brushed or otherwise suitably cleaned are placed in overlapping relationship as in FIG. 5 with the cleaned faces in engagement. They are staked 41 together at the corners of the panel in accordance with conventional practice. The staked sheets 40 and 40' are then fed as in FIG. 6 through the nip of a rolling mill 27 as in the previous embodiment to provide the desired "green" bond. Immediately after bonding as in the previous embodiment the composite metal panel 32 is cooled to a temperature at which noticeable bond enhancement will not occur for the particular materials being bonded. Since in this embodiment of the invention the original sheets were cut to a desired size to yield after rolling a desired size panel the shearing operation as described by reference to FIG. 3 is not required.

At this point, the panels 32 manufactured by the process described by reference to FIGS. 2 and 3 or the process described by reference to FIGS. 4, 5 and 6 are placed between die plates 50 and 51 as in FIGS. 7 and 8. The die plates 50 and 51 are clamped by conventional means such as press 53 and 54 to tightly seal the composite between them. At least one of the die plates includes a cavity 52 defining the desired pattern of tubular passageways 11 in the heat exchange panel 10. In the embodiment shown in FIGS. 7 and 8 only one of the die plates 50 and 51 includes such a cavity 52 so that the tubular passageways 11 which result will have one side flat. While only one die 50 has a cavity in the embodiments shown, if desired the opposing die 51 can have a cavity in correspondence with the cavity of the die 50 to provide tubular passageways 11 expanded out from both sides of the panel 32.

The tubular passageways are formed in the composite panel 32 by the application of fluid pressure. This is accomplished by inserting an inflation needle 60 into an edge 61 of the panel in communication with the desired tubular passageway pattern. Air or other suitable fluid is then forced into the composite panel to break the "green" bond between the sheets 40 and 40' or 21 and 23 in the region of the die cavity 52 where the sheets are not clamped together. Continued pressure deforms the sheets into conformity with the die cavity 52 thereby forming the desired passageway pattern in the composite panel 32. Suitable inflation pressures comprise from about 1000 to about 4000 psi. Inflation can be carried out pneumatically or hydraulically, however, pneumatic inflation is preferred.

Referring now to FIGS. 9 through 12 further details will be given concerning the inflation needle 60 arrangement in accordance with this invention. The composite panels 32 in accordance with this invention prior to inflation are in their full rolled temper. Therefore, the metal is comparatively hard from cold working. The panels 32 in accordance with this invention can be expanded in their as-rolled temper to provide the desired passageway configuration without treatment or softening of the composite metal. This is accomplished by controlling the tube height and tube cross section within certain critical limits. In particular, an oval or half oval tube configuration 63 has been found to be required.

Figure 10:
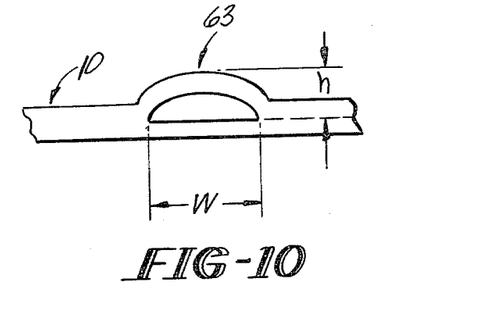
FIG. 10 is a partial cross-sectional view of a passageway in a heat exchanger panel of this invention.
Figure 11:
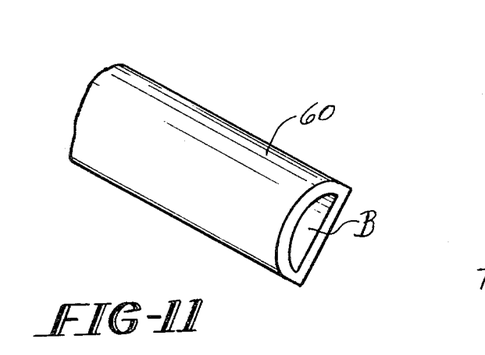
FIG. 11 is a perspective view of an inflation needle in accordance with one embodiment.
Figure 12:
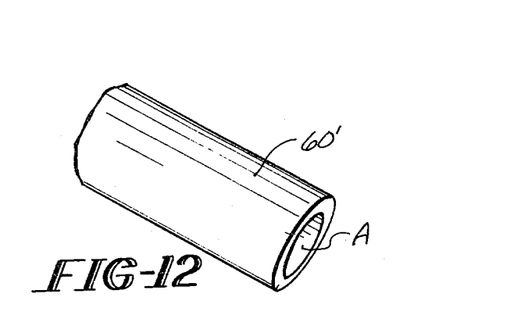
FIG. 12 is a perspective view of an inflation needle in accordance with a different embodiment.

In FIG. 10 a typical tube 11 cross section is shown. The aspect ratio of the inflated tube 11 comprises the peak height "h" of the tube wall divided by the width "W" of the tube. It has been found in accordance with this invention that the aspect ratio is critical when one attempts to inflate the composite metal panel 32 in the rolled temper. For copper Alloy C 11000 an aspect ratio of less than about 0.24 is required in order to avoid failure in the inflated tubes 11 such as necked regions in the tube wall or fractures in the tube wall. It is preferred in accordance with this invention that the aspect ratio be maintained at a level less than about 0.2 and most preferably less than about 0.15. Below 0.15 it is unlikely that a failure would occur in the tube wall of an inflated panel in accordance with this invention formed from a composite wherein the expanded tube wall is comprised of Alloy C 11000.

For other metals and alloys such as aluminum and aluminum alloys the aspect ratio may vary and is very much a function of the ductility of the metal in the rolled temper. An aspect ratio for copper or copper alloys of less than 0.15 appears to be acceptable in the light of the success of various commercially available copper solar panels sold by Olin Corporation under the name SOLAR-BOND ® which are formed by the ROLL-BOND ® process, since those panels have conventionally used aspect ratios of 0.14. It is possible in accordance with this invention to utilize die cavities 52 having sharp edges defining the edges of the tubular passageways as in FIG. 10 if one maintains the aspect ratio of the inflated tubes below the 0.15 limit. If those edges of the die cavity are rounded, then higher aspect ratios within the limits described above can be utilized.

Conventionally for inflating tube in sheet type composite metal heat exchange panels cylindrical inflation needles have been used. In view of the critical limits imposed upon the expansibility of the metal in the roll temper composite panels 32 of this invention it has been determined that the inflation needle must have an oval cross section so as to only deform the sheets 40, etc., within the critical limits of their aspect ratio. For a one side flat type configuration of the tubular passageways 11 the inflation needle 60 can have a D-shaped cross section as in FIG. 11. For a two side inflated tubular passageway 11 wherein the passageway is distended into both sheets of the composite panel 32, the inflation needle 60' would have the full oval shape as in FIG. 12. Each inflation needle 60 or 60' is hollow and includes a passageway A or B, respectively, which communicates between the source (not shown) for applying the inflation fluid under pressure to the panel 32 and the interior of the panel itself.

Figure 9:
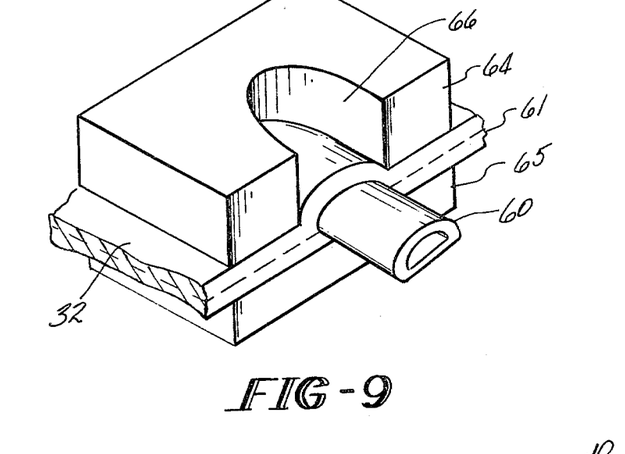
FIG. 9 is a partial perspective view showing an inflation needle insertion fixture.

In order to insert the inflation needle 60 or 60' into the panel 32 without unnecessarily peeling the composite metals apart a unique fixture has been devised as shown in FIG. 9. The fixture comprises two plates 64 and 65 clamped against opposing faces of the composite panel 32 at the edge 61 where the inflation needle is to be inserted. For a D-shaped inflation needle 60 one of the plates includes a U-shaped slot 66 extending in the direction of the inlet passageway 12. If one were employing the oval needle 60' of FIG. 11, then both plates 64 and 65 would include such a U-shaped slot 66. The U-shaped slot defines an opening into which the respective sheet 40 or 40' or 21 or 23 of the composite panel 32 can be expanded for inserting the inflation needle 60 or 60'. Since the two plates 64 and 65 are clamped together, the U-shaped slot serves to limit the total area of the composite panel 32 which can be separated or peeled apart. As in accordance with conventional practice, the composite panel 32 at the edge 61 adjacent the U-shaped slot 66 is pried apart using a chisel. When it is sufficiently pried apart, the inflation needle 60 or 60' is pushed into the pried apart opening to a desired extent.

When the panel 32 with the inflation needle is inserted into the dies 50 and 51 of FIGS. 7 and 8, the die cavity 52 closes down about the inflation needle 60 or 60' inserted in the panel to seal the sheets to the needle for the inflation operation. The plates 64 and 65 used for insertion of the needle 60 or 60' are, of course, not used during the actual inflation operation, but rather the die 50 and 51 itself clamps the composite sheets in the region of the inflation needle.

Figure 13:
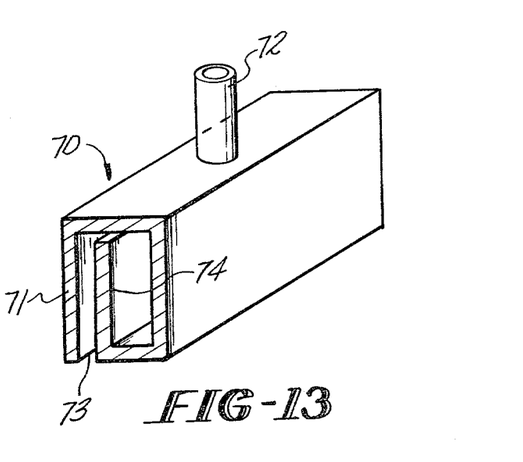
FIG. 13 is a perspective view in partial cross section of a coolant application chamber in accordance with this invention.

Referring now to FIG. 13 a coolant application apparatus 70 which could be used as the coolant application station 29 in either FIGS. 2 or 6 is shown. The coolant application station 70 comprises: a manifold 71; an inlet port 72; a discharge slot 73 and a baffle 74. The manifold is in the form of a rectangular six sided box. The end which is shown open in the section of FIG. 13 would be sealed by a suitable end plate (not shown). Water or other suitable coolant is pumped from a suitable source not shown into the inlet port 72. The water is uniformly distributed by the baffle 74 and fills the chamber defined by the manifold 71. The water is discharged as a water curtain onto the strip through the discharge slot 73.

The coolant application station 29 or 29' in accordance with the present invention should for copper or aluminum or alloys of copper or aluminum cool the composite panels 32 or strip 28 to a temperature preferably below about 200° C. and in particular to a temperature below the onset of recrystallization of the metal of the composite. In this way, bond enhancement will not occur to any effective extent. The coolant can be applied in any desired manner such as the water curtain as described above or as a spray. If a spray is used, it need not be at a very high pressure since it is not necessary for the water spray to pierce a boundary layer of steam as occurs in the prior art when spray quenching hot rolled metal.

The "green" bond in accordance with this invention as described above is preferably formed by cold rolling the strips 21 or 23 or sheets 40 and 40' together. This may be accomplished in a single pass through the rolling mill 27 or in multiple passes through the rolling mill as desired. The particular bonding process preferred in accordance with this invention is essentially that disclosed in the above-identified Australian patent to Watson. For copper and copper alloys it has been found that the bonding when carried out in a single pass should be accomplished by a total percent reduction in thickness of from about 45% to about 75% and preferably from about 60% to about 75%. If desired for shape or gage control. The bonding operation can be carried out in two or more passes wherein the percent reduction in thickness for the first pass is at least about 45% and the percent reduction in thickness in the second pass is up to an amount such that the total reduction in thickness of the composite strip is from greater than about 70% to less than about 85%. The total percent reduction in thickness of the overlapped sheets 21 and 23 or 40 and 40' comprise the original thickness of the overlapped sheets less the final thickness of the uninflated composite strip 28 or panel 32 divided by the original thickness of the overlapped sheets.

It has been found that if reductions in thickness in excess of the aforementioned ranges are utilized the composite metal strip 28 or panels 32 will be too strongly bonded together for them to be separated at reasonable inflation pressures. The bond strength of the composite increases rapidly to a level at which the bond is stronger than the metals of the composite, if the aforenoted ranges of reduction in thickness are exceeded. On the other hand, if too low a reduction in thickness is taken the composite metal sheets will not be sufficiently strongly bonded together to avoid being peeled apart or otherwise separated in use. It has been found in accordance with this invention that the bond strength provided by a reduction in thickness within the aforenoted ranges for copper and copper base alloys is sufficient to allow the as-inflated panel 10 to be used as a solar energy absorber panel 10 in low pressure applications without further bond enhancement.

For other alloy systems such as aluminum and aluminum alloys the percent reduction in thickness necessary to obtain the desired "green" bond will vary depending on the alloy and may be determined by routine experimentation but will always be in the range of 30 to 70%.

Panels of high copper alloys bonded within the ranges as above-identified possess a sufficient bond strength as described above that they will not peel apart when handled or in ordinary applications involving low pressure heat exchange fluids. If it is desired, however, that the bond strength of the panels after inflation be increased to insure their integrity and enable their use at higher working pressures this can be accomplished following inflation by a diffusion heat treatment which serves to enhance the bond strength of the composite panel. For copper and high copper alloys a suitable treatment would comprise holding the panels for at least about ½ hour at a temperature of at least about 400° C. For higher temperatures shorter times can be employed and visa versa. High pressure solar applications are those wherein the panels 10 must withstand potable water line pressure in regular service of approximately 60 psi and a test pressure of 150 psi. Low pressure applications are those in which operating pressures are on the order of 20 psi and test pressures in the 50 to 60 psi range.

"Green" bond as the term is used herein refers to a bond of moderate strength which will not break in ordinary handling but which will break at inflation pressures within the abovenoted range of from about 1000 to about 4000 psi. Bond enhancement as the term is used herein refers to an increase in bond strength after completion of the bonding operation, e.g., cold rolling. Bond enhancement is a kinetic process dependent on temperature and time at temperature, with the temperature being far more significant than the time.

The process and apparatus of this invention are applicable to a wide range of metals and alloys including copper and copper alloys, aluminum and aluminum alloys as noted above as well as iron and iron alloys and the alloys of other engineering metals. Particularly preferred metals and alloys include high copper alloys for good conductivity and cupro-nickel alloys for corrosion resistance.

The patents which are set forth in this application are intended to be incorporated by reference herein.

It is apparent that there has been provided in accordance with this invention a process and apparatus for making composite sheet and heat exchanger panels therefrom which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for making a metal composite adapted for use in heat exchanger panels, said apparatus comprising:
    means for bonding together at least two sheets of metal to form a green bond between said sheets, said bonding means comprising means for cold rolling said sheets to a desired reduction in thickness; and
    means for preventing enhancement of said green bond between said sheets due to a temperature increase in said sheets during bonding by said cold rolling means, said bond enhancement preventing means comprising means arranged in close proximity to said cold rolling means which receives said green bonded sheets therefrom and immediately quickly cools said green bonded sheets to a temperature at which bond enhancement will not occur.

2. An apparatus as in claim 1 wherein said means for quickly cooling said green bonded sheets comprises coolant application means arranged above said green bonded sheets.

3. An apparatus as in claim 2 wherein said coolant application means comprises means for applying a flowing curtain of coolant to said green bonded sheets.

4. An apparatus as in claim 3 wherein said coolant application means comprises a manifold, said manifold having a slot therein for discharging said coolant onto said strip.

5. An apparatus as in claim 1 wherein each of said sheets of metal prior to bonding is arranged in a coiled form whereby it is possible to provide a continuously green bonded composite strip having a substantial length, said apparatus further including means for operating upon said continuously green bonded composite strip for severing therefrom at least one composite metal panel having a desired length.

6. An apparatus as in claim 5 further including means for forming a desired pattern of tubular passageways in said composite metal panel.

7. An apparatus as in claim 6 wherein said means for forming said desired pattern of tubular passageways comprises: opposed die means for clamping said composite metal panel therebetween; at least one of said die means having a cavity therein defining said desired pattern of tubular passageways; and means for applying a fluid under pressure to said composite metal panel, to break the green bond between said sheets in correspondence with said die cavity and to deform said sheets into conformity with said die cavity, thereby producing said desired pattern of tubular passageways.

8. An apparatus as in claim 1 wherein said at least two sheets of metal have a preselected length which will provide a green bonded composite panel after said cold rolling having a desired length, said apparatus further including means for securing said at least two sheets of metal together prior to their being operated upon by said bonding means.

9. An apparatus as in claim 8 further including means for forming a desired pattern of tubular passageways in said composite metal panels.

10. An apparatus as in claim 9 wherein said means for forming said desired pattern of tubular passageways comprises: opposed die means for clamping said composite metal panel therebetween; at least one of said die means having a cavity therein defining said desired pattern of tubular passageways; and means for applying a fluid under pressure to said composite metal panel, to break the green bond between said sheets in correspondence with said die cavity and to deform said sheets into conformity with said die cavity, thereby producing said desired pattern of tubular passageways.

11. A process for producing a metal composite adapted for use in heat exchanger panels comprising:
    providing at least two sheets of metal;
    cold rolling said sheets of metal together to a desired reduction in thickness to form a green bond therebetween; and
    immediately after said cold rolling, quickly cooling said green bonded sheets to a temperature at which bond enhancement due to a temperature increase in said sheets during said cold rolling will not occur.

12. A process as in claim 11 wherein said step of quickly cooling said green bonded sheets comprises applying coolant to said sheets from above.

13. A process as in claim 12 wherein said coolant application step comprises applying a flowing curtain of coolant to said sheets.

14. A process as in claim 11 wherein each of said sheets of metal is arranged in a coiled form prior to bonding and wherein said bonding step is carried out continuously to form a composite strip having a substantial length and further including the step of operating upon said composite strip for severing therefrom at least one composite metal panel having a desired length.

15. A process as in claim 14 further including the step of forming a desired pattern of tubular passageways in said composite metal panel.

16. A process as in claim 15 wherein said step of forming said desired pattern of tubular passageways comprises: providing opposed dies wherein at least one of said dies has a cavity therein defining said desired pattern of tubular passageways; clamping said composite metal panel between said dies and applying a fluid under pressure to said composite metal panel to break the green bond between said sheets in correspondence with said die cavity and to deform said sheets into conformity with said die cavity thereby producing said desired pattern of tubular passageways.

17. A process as in claim 11 wherein said at least two sheets of metal have a preselected length which will provide a green bonded composite panel after said cold rolling having a desired length, said process further comprising securing said at least two sheets of metal together prior to their being bonded.

18. A process as in claim 17 further including the step of forming a desired pattern of tubular passageways in said composite metal panels.

19. A process as in claim 18 wherein said step of forming said desired pattern of tubular passageways comprises: providing opposed dies wherein at least one of said dies has a cavity therein defining said desired pattern of tubular passageways; clamping said composite metal panel between said dies and applying a fluid under pressure to said composite metal panel to break the green bond between said sheets in correspondence with said die cavity and to deform said sheets into conformity with said die cavity thereby producing said desired pattern of tubular passageways.

20. A process as in claim 11 wherein said step of cold rolling is carried out in a single pass and wherein said desired reduction in thickness comprises from about 45% to about 75%.

21. A process as in claim 20 wherein said desired reduction in thickness is from about 60% to about 75%.

22. A process as in claim 11 wherein said step of cold rolling is carried out in multiple passes and wherein the total reduction in thickness during cold rolling is from greater than about 70% to less than about 85% and wherein the reduction in thickness for the first pass of cold rolling is at least about 45%.

* * * * *